United States Patent [19]

Flynn et al.

[11] Patent Number: 5,347,653
[45] Date of Patent: Sep. 13, 1994

[54] SYSTEM FOR RECONSTRUCTING PRIOR VERSIONS OF INDEXES USING RECORDS INDICATING CHANGES BETWEEN SUCCESSIVE VERSIONS OF THE INDEXES

[75] Inventors: Rex A. Flynn, Belmont; Peter G. Anick, Marlboro, both of Mass.

[73] Assignee: Digital Equipment Corporation, Maynard, Mass.

[21] Appl. No.: 722,696

[22] Filed: Jun. 28, 1991

[51] Int. Cl.$^5$ .............................................. G06F 15/40
[52] U.S. Cl. ................................... 395/600; 395/425; 364/255.2; 364/282.1; 364/285.1; 364/DIG. 1
[58] Field of Search ................... 395/425, 600, 800

[56] References Cited

U.S. PATENT DOCUMENTS

| | | | |
|---|---|---|---|
| 4,646,229 | 2/1987 | Boyle | 395/600 |
| 4,853,843 | 8/1989 | Ecklund | 395/600 |
| 5,047,918 | 9/1991 | Schwartz et al. | 395/600 |
| 5,146,221 | 9/1992 | Whiting et al. | 341/67 |
| 5,179,711 | 1/1993 | Vreeland | 395/775 |

OTHER PUBLICATIONS

Matts Ahlsen et al. "An Architecture for Object Management in OIS", 1984, pp. 570–581.
Klaus R. Dittrich et al. "Versioned Support for Engineering Database Systems" Apr. 1988, Transactions on Software Engineering, vol. 14, No. 4, pp. 429–437.
William Kent "An Overview of the Versioning Problem", Jun. 1989, pp. 5–7.
George P. Copeland "Identity and Versions for Complex Objects" 1986 Int'l Workshop on Object Oriented Database Systems, p. 214.
Gerald Salton *Automatic Text Processing*, pp. i–xiii, 229–424, 1989.
Michael Stonebraker "The Design of the Postgres Storage System", 1987, pp. 286–297.
Curtis Kolovson et al. "Indexing Techniques for Historical Databases" Apr. 6, 1989, pp. 1–11.
Curtis P. Kolovson et al. "S–Trees: Database Indexing Techniques for Multi-Dimensional Interval Data" Apr. 27, 1990, pp. 1–17.
Randy H. Katz et al. "Database Support for Versions and Alternatives of Large Design Files" IEEE Transactions on Software Engineering, vol. SE-10, No. 2, Mar., 1984, pp. 191–200.
Lay-Peng Ong et al. "A Unified Framework for Version Modeling Using Production Rules in a Database System" Apr. 27, 1990, pp. 1–23.
Richard Snodgrass "Temporal Databases Status and Research Directions" Sigmod Record, vol. 19, No. 4, Dec., 1990, pp. 83–97.
Blanken, H., "Implementing version support for complex objects"; Data & Knowledge Engineering, vol. 6, No. 1, Jan. 1991 pp. 1–25.
Abbod T., Brown K., Noble H. "Providing Time-Related Constraints for Conventional Database Systems"; Proceedings of the 13th VLDB Conference, Sep. 1987, Brighton, UK pp. 167–175.
Lomet D., Salzberg B. "Access Methods for Multiversion Data"; Sigmod Record vol. 18, No. 2, Jun. 1989, pp. 315–324.

*Primary Examiner*—Thomas C. Lee
*Assistant Examiner*—Paul Harrity
*Attorney, Agent, or Firm*—Kenyon & Kenyon

[57] ABSTRACT

A method and apparatus for providing an historical perspective into a database of information objects through an efficient method and apparatus for versioning information objects stored in a database as well as an index representative of the information objects is disclosed. The latest versions of each one of the information objects and each one of the entries in the index are maintained in the database. Partial earlier versions of each one of the information objects and each one of the index entries are stored with the latest versions. The partial versions contain only sufficient information about the differences between the earlier versions and the later ones so that any earlier version may be reconstructed. Identification tags are employed as unique identifiers for each one of the plurality of information objects and for different versions of the information objects. Through the exploitation of the relative time ordering of generated identification tags, an efficient index representation and method for performing historical queries is provided.

13 Claims, 14 Drawing Sheets

FIG. 8A

```
                                                          ← 50
        ┌─ 52
    ┌───┴──────────────────────────────────────────────────┐
    │  OBJECT ID: 10                                       │
    │  LATEST                                              │
54 ─┤  VERSION  : TIME 14                                  │
    │     56 ─── NAME:      "ARTICLE-CLASS"                │
60 ─┤     58 ─── FIELDS:    "TITLE","AUTHOR","VISIBILITY"  │
    │  PRIOR                                               │
    │  VERSION  : TIME 10                                  │
92 ─┤     94 ─── FIELDS:    "TITLE","AUTHOR"               │
    └──────────────────────────────────────────────────────┘

┌──────────────────────────────────────────────────────┐
62 ─┤  OBJECT ID: 11                                       │
    │  LATEST                                              │
64 ─┤  VERSION  : TIME 13                                  │
    │     66 ─── INST-OF :  OBJ: 10 TIME 10                │
    │     68 ─── TITLE:     "DISTRIBUTED AND NETWORKED SYSTEMS" │
72 ─┤     70 ─── AUTHOR:    "PETER ANICK"                  │
    │  PRIOR                                               │
    │  VERSION  : TIME 12                                  │
86 ─┤     88 ─── TITLE:     "NETWORKED SYSTEMS"            │
    │  PRIOR                                               │
    │  VERSION  : TIME 11                                  │
80 ─┤     82 ─── TITLE:     "DISTRIBUTED SYSTEMS"          │
    └──────────────────────────────────────────────────────┘

┌──────────────────────────────────────────────────────┐
96 ─┤  OBJECT ID: 15                                       │
    │  LATEST                                              │
98 ─┤  VERSION  : TIME 15                                  │
    │    100 ─── INST-OF:   OBJ: 10 TIME 14                │
    │    102 ─── TITLE:     "DATABASE SYSTEMS"             │
110─┤    104 ─── AUTHOR:    "PETER ANICK"                  │
    │    106 ─── VISIBILITY: "CUSTOMER"                    │
    └──────────────────────────────────────────────────────┘

74 ─┤ TITLE."DISTRIBUTED"    { 11 }         [+.13.11] [-.12.11]
76 ─┤ TITLE."SYSTEMS"        { 11 , 15 }
78 ─┤ AUTHOR."PETER ANICK"   { 11 , 15 }
84 ─┤ TITLE."NETWORKED"      { 11 }         [+.12.11]
```

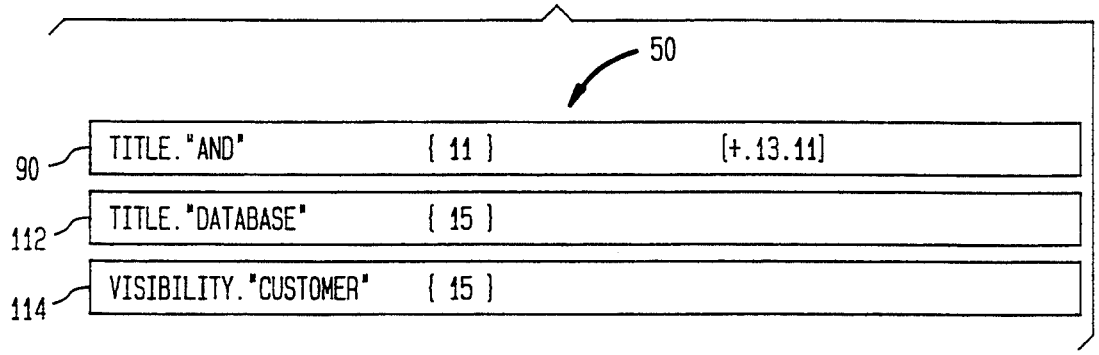
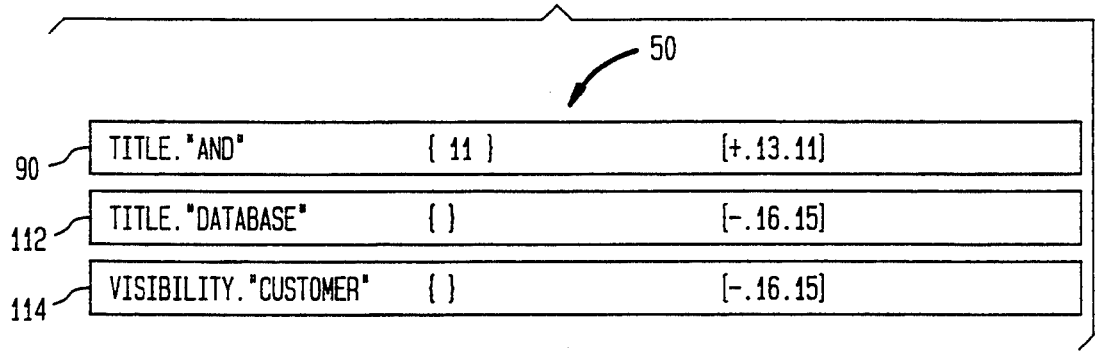

5,347,653

SYSTEM FOR RECONSTRUCTING PRIOR VERSIONS OF INDEXES USING RECORDS INDICATING CHANGES BETWEEN SUCCESSIVE VERSIONS OF THE INDEXES

FIELD OF THE INVENTION

The present invention relates to an information retrieval system, and, more particularly, to an information retrieval system that facilitates the indexing and retrieval of historical versions of information objects.

BACKGROUND OF THE INVENTION

Since the advent of computers, the organization, storage and manipulation of large amounts of data have been important concerns to computer users. One example of an effort to organize data for a user is a "database" which can be defined as a set of logically related information objects or files stored together without unnecessary redundancy to serve multiple applications. A database facilitates access by one or more applications programs.

Programs referred to as "database management systems" ("DBMS") provide users with an interface to the database. The DBMS is a program which provides the structure to the database that enables users to access information objects stored in the database. The DBMS identifies and retrieves certain information objects from the files in response to information requests, i.e., "queries" from a user. The retrieval of particular information objects depends on the similarity between the information stored in the information objects and requests presented to the system by a user. The similarity is measured by comparing values of certain attributes attached to the information objects and information requests.

To facilitate the retrieval process, information objects in a database are "indexed" so that the information objects are characterized by assigning descriptors to identify the content of the information objects. The process of characterizing the information objects, referred to as "indexing," can lead the DBMS to particular items in the database in response to specific queries from a user.

An example of a system utilizing a database is an information retrieval system. Information retrieval systems are databases that are optimized towards retrieval, rather than update operations (such as, e.g., a banking transaction system). Full-text information retrieval systems are retrieval systems for information objects such as, e.g., articles from magazines, newspapers, or other periodicals, where queries can be performed to retrieve these objects by their content. This is typically done by assigning descriptors to the content, e.g., the words that appear in the articles, and indexing the information objects by their descriptors.

In many situations, a user of an information retrieval system may issue a temporal, i.e., time-based query which seeks historical information for a specified time period. One such example is where a user wishes to locate all information objects that contained specific references to, for example, the phrase "database management systems" prior to 1990. An information retrieval system must maintain historical information about each of the information objects in the associated database in order to process such a query. Thus, separate "versions" of the information objects stored in the database must be maintained in order to process temporal queries.

One approach to providing historical versioning in existing database systems is to store versions of each information object separately, with a timestamp attached to each information object version to distinguish it from the other information object versions. Another approach is to store the versions together, in which case versions after the original information object may only need to be represented by their differences from the previous version. This may save a considerable amount of space in a large database.

With a typical database system, there are two steps in resolving a query. The first step is to determine which clauses in the query have associated index entries in the index, to retrieve on those index entries, and perform a preliminary restriction on the set of information objects being considered. The second step will take the set of information objects from the first step and examine each information object in turn to determine if it satisfies the query. This technique can be quite efficient because frequently queries are performed to retrieve information objects by "keys" (e.g., an account number for a banking transaction), resulting in only one information object being returned from the first step. The same two-step method of resolving a query can be applied to an historically versioned database where the information object versions are stored together by further restricting on the time stamps stored with each information object in the second step.

Query processing tends to be different in a full-text information retrieval system, because any one of the descriptors in the index entries that are used for retrieval may match hundreds or thousands of information objects. The expectation with full-text information retrieval systems is that most, if not all, of the restriction processing of the query will occur solely in the first step, by examining the index entries and not the information objects themselves. Versioning a full-text information retrieval system by versioning the information objects alone therefore presents difficulties, because it requires that every information object must be examined to determine if the appropriate version satisfies the query. This could take a considerable amount of time in most full-text information retrieval systems.

Current research in database systems has provided methods for defining a temporal index which comprises a plurality of index entries representative of the objects stored in the database that has built in time information. Placing time information in an index facilitates processing of a time based query in that the query can be processed against the index to ascertain if it meets the time limitation without the need for retrieving each information object itself. Therefore, the use of a temporal index presents considerable advantages for a versioned full-text information retrieval system.

The difficulty with using a temporal index in a versioned full-text information retrieval system is that the obvious implementation of adding time stamps to the index would incur a prohibitive space cost in memory. The space cost incurred by the index of existing non-versioned full-text retrieval systems is significant, even accounting for sophisticated compression techniques, and is the topic of on-going research.

The foregoing problems of prior art full-text information retrieval systems manifest the need for improvement. Specifically, while there is a need for providing historical queries into full-text information retrieval systems, this capability must be implemented without significantly impacting the performance of the system.

SUMMARY OF THE INVENTION

The present invention provides a user with an historical perspective into a database of information objects through an efficient method and apparatus for versioning information objects stored in a database as well as an index representative of the information objects.

Generally, the operating environment of the present invention includes a general purpose computer system which comprises a computer having memory, and associated peripheral equipment such as disk drives, tape drives and video display terminals. A database of information objects is maintained on the disk drive or some other storage medium in the computer system. The database is logically partitioned to include a database containing the information objects and an index representative of the information objects.

The present invention achieves versioning by maintaining complete "latest" versions of each one of the plurality of information objects and each one of the plurality of index entries in the index. The "latest" version refers to a version of an information object that reflects the most recent state of an information object. Any version that is prior to the latest version is maintained by recording only the portions of the prior version which represent the differences (which are referred to as "delta changes") between it and the latest version. The delta changes are encoded representations of the changes that are used to generate an older version of an information object or index entry from the latest version. The changes are stored as incremental backup changes to the information objects and index entries for each time the objects or index entries were changed.

If there is more than one prior version, each prior version is maintained by recording only the portions of the prior versions which represent the differences between it and the more recent prior version. The prior versions are appended to the latest version of each information object or index entry in reverse order of creation with the later versions first. This collection of "all versions" is written to and retrieved from the database as a single unit.

In order to reconstruct a particular version of an information object or index entry, the collection of "all versions" is retrieved from disk. The latest version of the information object or index entry is then retrieved from this collection. The differences in all versions more recent than the version requested are applied iteratively to the latest version to obtain the desired version. This "version reconstruction" operation is optimized to require the least effort to retrieve latest versions of information objects and index entries because they are accessed more frequently than prior versions.

The delta changes are encoded representations of the changes that are used to generate an older version of an information object or index from the latest version. The changes are stored as incremental backup changes to the information objects and index entries for each time the objects or index entries were changed. Versioning of information objects and index entries is achieved through the use of identification tags which are generated by an identification generator function of the associated computer. The identification tags are generated when any database event occurs, i.e., the creation, modification or deletion of an information object. One unique identification tag is generated for each such event and is stored in the database with the affected information object. Since the index is generated from descriptors of the contents of the information objects, the index reuses the identification tags associated with the information objects.

The present invention utilizes two categories of identification tags. These tags are referred to as a first identification tag and a second identification tag. Every information object in the database has an unique first identification tag which is generated when the first version of the information object is created. Each subsequent version of an information object has a different second identification tag stored with it which represents the values generated by the identification generator function when an information object in the database is modified. Since the identification generator function generates unique first and second identification tags in ascending order, each later version of an information object has a higher second identification tag associated with it. The second identification tag of the first version of every information object is the same as its first identification tag. The second identification tags, therefore, serve as a version numbering scheme for the different versions of the object.

Since the identification tags are assigned serially, any identification tag may define a view of the whole database of information objects at a particular point in time. Given such a "viewing" identification tag, the version of any information object that was "current", i.e., the latest, at the time that an identification tag was assigned is the latest version whose second identification tag is less than or equal the viewing identification tag. Therefore, the identification tags are referred to interchangeably as delta times. Given a separate file which maps real times to identification tags, a view of the information objects may be reconstructed for any historical time.

The present invention provides a parallel method for viewing all of the index at a single delta time. The index is constructed based on the contents of the information objects. The creation of an information object, or the modification of an information object, will result in descriptors being assigned to the index representative of that information object during indexing. Descriptors are representative of a portion of the content of an information object. These descriptors will be used in turn to update the index. There is one index entry for every unique descriptor in the database. The set of all first identification tags for information objects which had the descriptor assigned to them during indexing is logically stored with that index entry. This set of first identification tags is versioned. The latest version is stored completely as a set of first identification tags. Earlier versions of index entries indicate changes that were made to the set of first identification tags, at particular delta times; these are appended to the latest set of first identification tags in descending version order. Each version of an index entry before the latest comprises a second identification tag, a first identification tag, and an indicator of whether the first identification tag was to be added or removed from the set at that delta time. Reconstruction of the set for an index entry at a particular delta time is achieved in the same manner as with information objects described above.

The present invention achieves efficient index representations through a number of techniques. Among these techniques are that the set of first identification tags that is kept with the latest version of an index entry may be compressed by any of the standard techniques used in information retrieval systems. Unlike other versioned representations, there are no version numbers or timestamps in this set. When an information object is modified, typically only a small modification is made (a spelling correction to a word, for example). This modification will typically only cause a few descriptors to be added to or removed from the set of descriptors associated with the information object during indexing. For the descriptors that were associated with the information object in both versions, no change needs to be made to the associated index, since they already indicate membership for the prior version. This process is referred to as "partial reindexing" since only a few index entries need to be affected for a modified object.

When an information object is created, the affected index entries need not store a version indicating the addition of the first identification tag representative of the addition of a new information object to the database. Such a version would have the same first and second identification tags, and would therefore be redundant with the first identification tag being stored in the latest version of an index entry. This introduces one additional operation into the reconstruction of an earlier version of an index entry. All first identification tags which are higher than the delta time of the request must be eliminated from the latest set.

The additional space overhead required to add versioning to the index is low since typically very few modifications are made to the information objects in most textual information retrieval systems. The index space overhead resulting from the creation of an information object is comparable to existing non-versioned information retrieval systems (a set of ID's which must be compressed). The space overhead attributable to versioning occurs exclusively as information objects are modified, when prior versions of the information object must be appended to the affected index entries. The relative cost of these modification records is small when compared with the massive indexing common to full-text information retrieval systems, where every word in an article is indexed.

BRIEF DESCRIPTION OF THE DRAWINGS

FIGS. 8A-8B illustrate a modified version of the exemplary database constructed according to the present invention illustrated in FIG. 7.

FIGS. 9A-9B illustrate a modified version of the exemplary database constructed according to the present invention illustrated in FIGS. 8A-8B.

DETAILED DESCRIPTION

Figure 1:
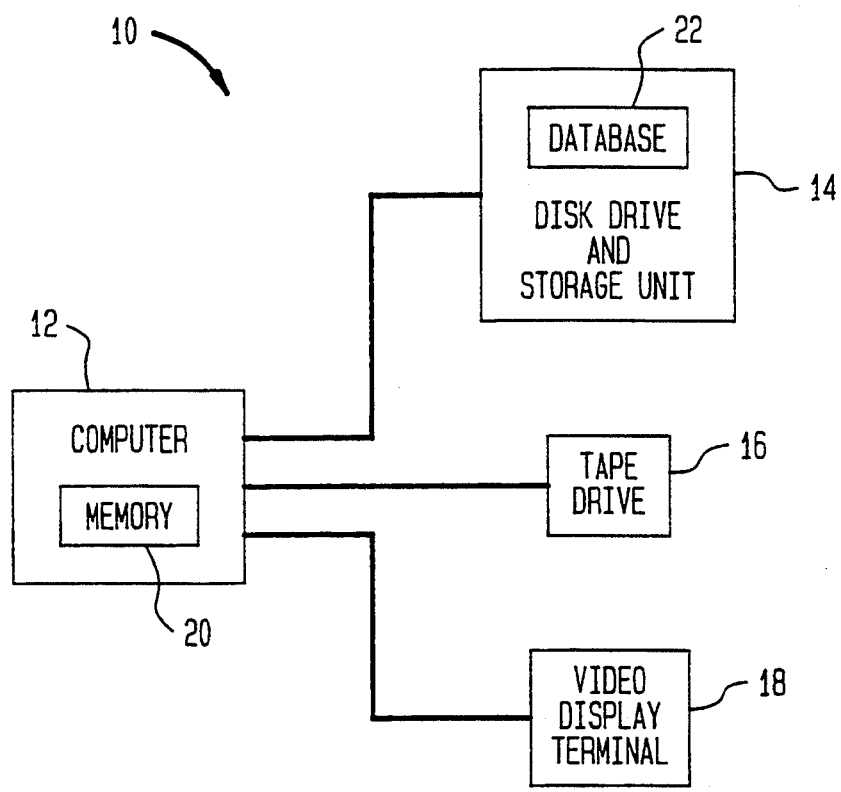
FIG. 1 illustrates an exemplary embodiment of a system for implementing the present invention.

For a complete understanding of the present invention, a brief discussion of terminology and definitions is set forth below. The terms are initially defined out of context but will be useful to understand the description of the present invention that follows.

Information objects or objects are defined as collections of named values. A common way of describing them is that objects are collections of field/value pairs. Examples of different fields that may comprise an object are an author field where the name of the author is stored, a title field where the title of the object is stored and a text field where the actual text of the object is stored. Objects that are "instances", i.e., occurrences of the same Class, share the same fields but they may have different values. The Class of an object is found by looking at the value of the object's "Inst-Of" field which indicates that the object is an instance of another object.

Classes are also objects. A Class describes which fields its instances have. These fields are stored in the "Fields" field of the Class. In the exemplary embodiment described below, Classes may have multiple versions just as any other object may have multiple versions. Explicitly defining Classes allows different "types" of information objects to exist in the same database. Versioning the Classes means that the description of the objects can be changed without causing disruption in accessing the objects themselves. If the Classes were not versioned, then changing a Class would make the database inoperable until the objects were modified accordingly. With versioning, an object may reference (via its "Inst-of" field) the appropriate version of the Class that corresponds to it and, therefore, be interpreted correctly. The example set forth below illustrates how two different objects can point to different versions of a Class and, therefore, contain different fields.

Identification tags, delta ID's, object ID's, times, delta times are all terms used in this application for the values generated by an identification generator function that generates unique identification tags ("ID's") sequentially (starting at 1) for every event, e.g., adding or modifying an object, that occurs in the database. Since the ID's are generated sequentially, the assignment of ID's is time ordered. The time ordering is, however, relative.

Index Entries are created for every unique Field-value pair encountered in the database. One index entry logically contains the set of all objects in the database that have that field-value pair. This concept is complicated slightly by the type of field.

Objects are versioned in that when an object is changed, the old version of the object is logically preserved. The index is versioned as well.

There are three kinds of database updates which can be performed on a database constructed according to the present invention. They are adding a new object, modifying an object in the database and deleting an information object in the database. These operations are described below.

Referring now to the drawings, and initially to FIG. 1, there is illustrated an exemplary embodiment of a system for implementing the present invention. The system 10 comprises a computer 12 with associated peripheral equipment such as a disk drive and storage unit 14, a tape drive 16 and a video display terminal 18. The computer 12 is generally any high performance computer such as Digital Equipment Corporation VAX 6000-100 having a memory 20 associated therewith. In conjunction with the computer 10, a database 22 is stored on the disk drive 14. The video display terminal 18 which includes a keyboard (not shown) is the user interface to system 10 and is used by a user to input query information (via the keyboard) and to view the retrieved records as a result of such queries.

Figure 2:
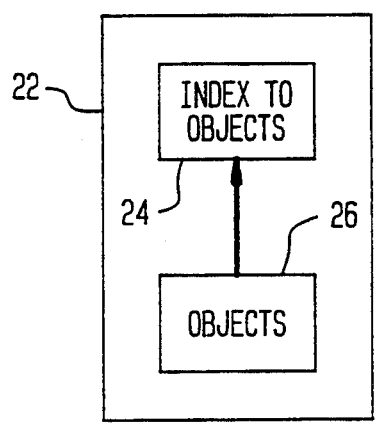
FIG. 2 illustrates an exemplary logical organization of a database.

Reference is now to made to FIG. 2 to illustrate an exemplary logical organization of the database 22 that can be used in conjunction with the system 10 illustrated in FIG. 1. The database includes information objects and an index representative of the information objects. The database 22 includes an objects database 26 and an index database 24. The objects database 26 is logically where the objects are stored. The index database 24 is where the index that is representative of the objects stored in the objects database 26 are stored. Portions of the database 22 can be read into the memory 20 as needed.

As described below, the present invention exploits the correspondence between time and identification tag generation in an identification tag object system to implement an efficient versioned object indexing scheme. Sequential identification tags, starting at one, are used as record identifiers. The identification tags are generated by an identification generator function of the computer 12 for each event that occurs in a database constructed according to the present invention. These identifiers are referred to as "delta ID's." When an object is created, a delta ID referred to as an "object ID" is generated by the identification generator function and is stored in the database 22 with the information object. When the object is updated, the new version of the object is identified with a "delta ID" which is generated by the identification generator function of the computer 12 at the time the update event occurs. Thus, each sequential identification tag corresponds to a change to the database 22. Each object retains the modification to the field values that occurred at each delta time, thereby allowing all versions of an object to be reconstructed. Objects can refer to other object versions using a combination of object ID and delta ID.

The present invention requires that only affected fields be reindexed when an object is updated. In this method, each index entry contains only object ID's, not delta ID's. In addition, each index entry has an accompanying sequential list, in order of recentness, of historical change records in the form ({+/−}, delta time, object ID), which describe how the index entry must be corrected to compute the state of the index entry at a previous point in time. The plus/minus sign indicates if the change record is an addition or deletion modification. The delta time indicates the time that the addition/deletion occurred. The object ID identifies the object affected by this change record. An index entry snapshot at any delta time x may be retrieved by eliminating those object ID's greater than or equal to x and then applying the correction records with delta time greater than x to the index entry.

Set forth below is an example of a database in an information retrieval system which is constructed according to the present invention. The system stores information objects, such as symptom-solution articles, notes, file entries, etc. Fields in the information objects may contain text. For each word in a text field, an index entry is created which contains a set representing those objects which contain the word in the particular text field. Other field types such as date or author may be indexed using the entirety of the value (e.g., the whole author name) rather than a portion of the value.

Reference is now made to FIGS. 3–9B to fully illustrate how a database according to the present invention is constructed. An exemplary database is shown in various stages of construction to illustrate the features of the present invention. All reference numerals from preceding figures are carried forward into subsequent figures to maintain the continuity of the description.

Figure 3:
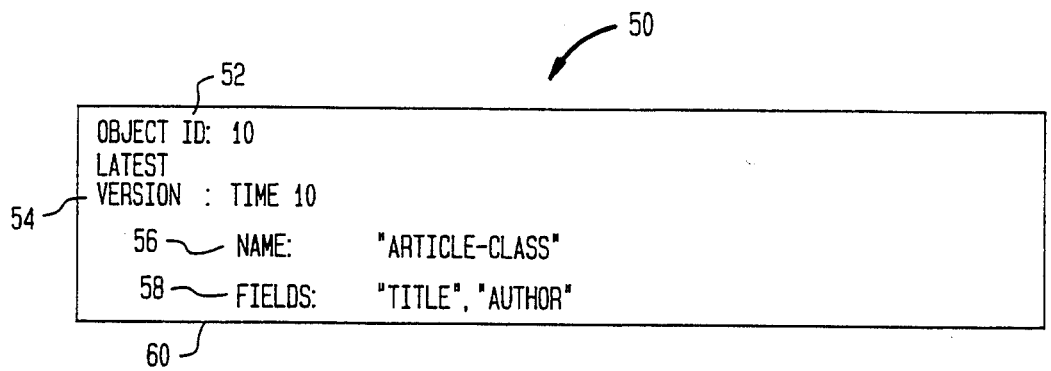
FIG. 3 is an illustration of an exemplary database constructed according to the present invention.

Referring now to FIG. 3, there is illustrated an exemplary database 50 having an object 60 stored therein. The object 60 can be referred to as a "header" object in that it establishes the format for the class of objects which are instances of the object 60. The object 60 has a unique identification tag referred to as an object ID 52 which is representative of the time this version of the object 60 was created. The value of the identification tag generated by the identification generator function of the computer 12 (FIG. 1) and assigned to the object 60 is 10. Also included in the object 60 is a version field 54 referred to as a delta ID 54 which is also representative of the time this version of the object 60 was created. Since this is the first version, the value of the object ID 52 and the value of the delta ID 54 are identical (i.e., 10). A name field 56 defines the object 60 as an "Article-Class" object. Field 58 specifies the fields that all instances of the object 60 will contain.

As indicated by the value of the object ID 52 and the delta ID 54, the Article-Class was added at time 10. This time value 10 generated by the identification generator function of the computer 12 (FIG. 1) is a timestamp that is representative of the time the event of adding Article-Class to the database 60 occurred.

Figure 4:
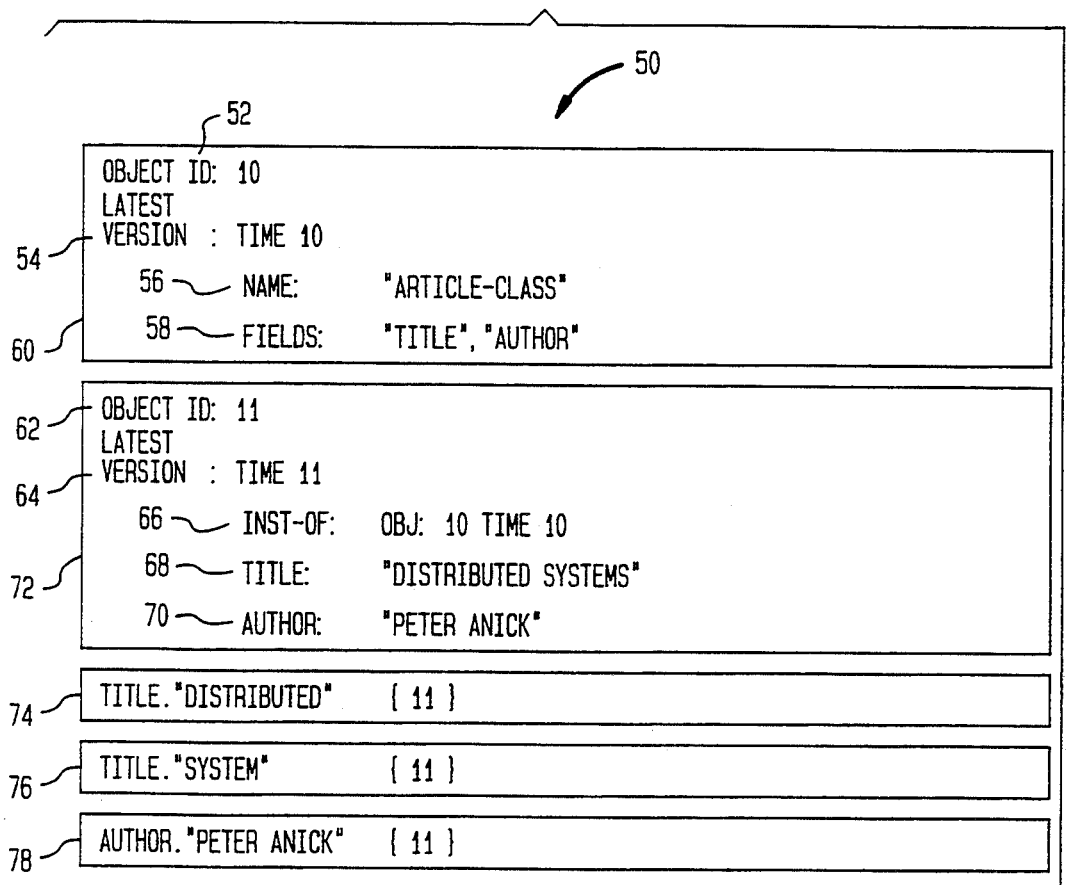
FIG. 4 is an illustration of a modified version of the exemplary database constructed according to the present invention illustrated in FIG. 3.

Referring now to FIG. 4, there is illustrated the exemplary database 50 of FIG. 3 after a second object 72 has been added. At time 11 as indicated by the value of object ID 62, an instance of Article-Class was added. The object 72 has field/value pairs for the Title field 68, Author field 70 and Inst-Of field 66 indicating that the object 72 is an instance of the object 60.

Also shown in FIG. 4 is a portion of an index which contains index entries 74, 76 and 78 representative of the values stored in the Title field 68 and the Author field 70 of the object 72. These index entries are shown as being contiguous or in the same area of the database 50 as the objects 60 and 72 for illustrative purposes only. As illustrated in FIG. 2, the index portion of the database 24 and the object portion of the database 26 can be logically separate.

Index Entries are shown for each field/value pair in the database 50. The left side of the index entries 74, 76 and 78 indicate the field/value pair that is indexed. The number in brackets indicates the set of objects, by object ID, that contain the field/value pair as of the latest time in the database 50.

The index entry 78 is for all objects -which contain the field/value pair, Author "Peter Anick." In this case, the author field is indexed on the entirety of its contents. As illustrated, the index entry 78 contains a value 11, which is the object ID, which indicates that the object 72 contains the field/value pair, Author "Peter Anick." Since there are no subsequent change records, the value of the object ID in the set also indicates that it was added to the index entry at time 11, i.e., when the object was created. The index entries 74 and 76 likewise indicate the object 72 (which is identified by the value 11), where, instead of indexing on the entire field/value, portions of the value are used. This causes two separate index entries to be created, for Title "distributed" and Title "systems," respectively.

Figure 5:
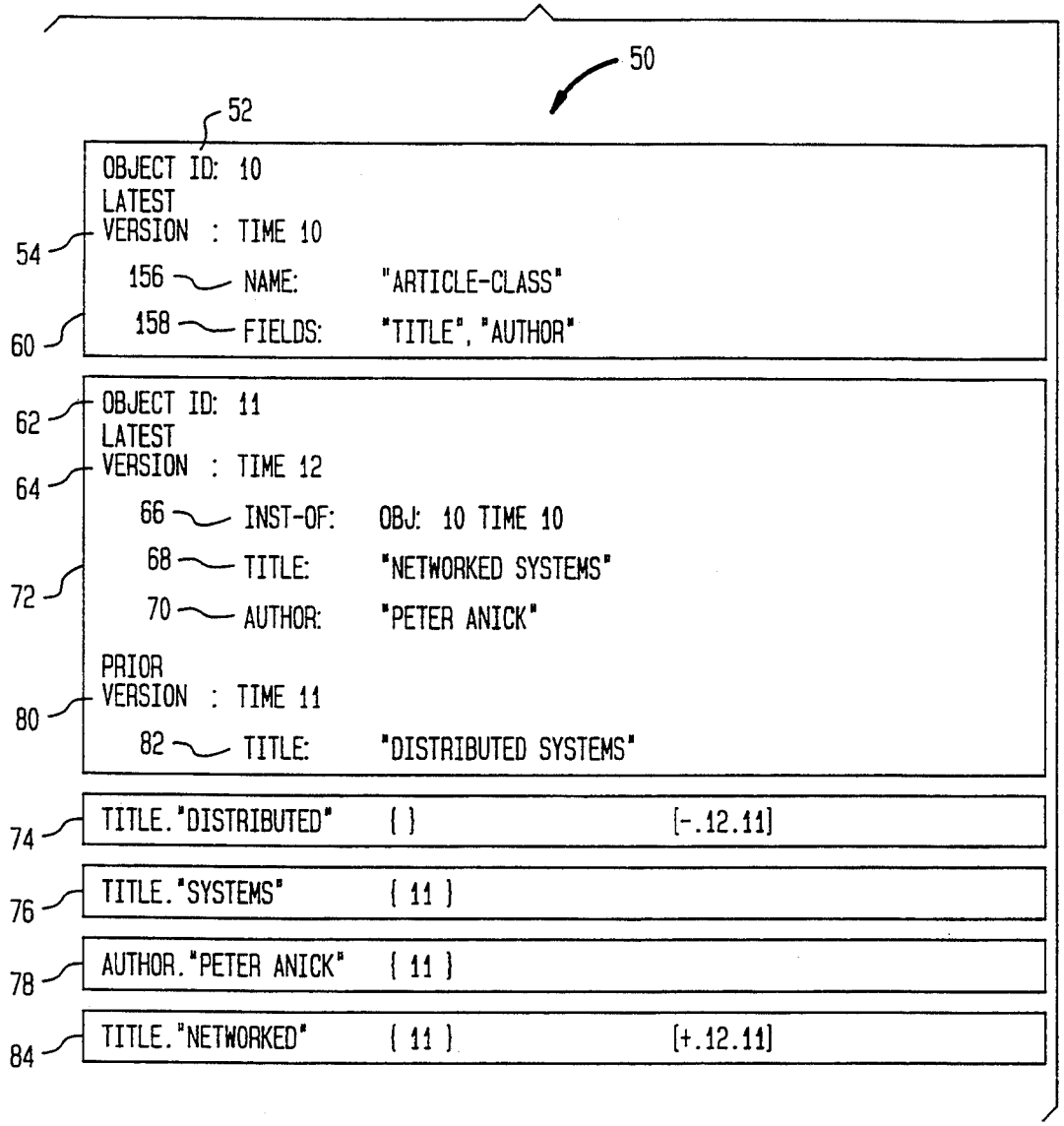
FIG. 5 is an illustration of a modified version of the exemplary database constructed according to the present invention illustrated in FIG. 4.

Referring now to FIG. 5, there is illustrated the exemplary database 50 of FIG. 4 after the second object 72 has been modified. At time 12 indicated by the value stored in the latest version field 64, the value in the Title field 68 of the object 72 has been modified from "distributed systems" to "networked systems." A new version of the object 72 referred to as the "latest version" is created to reflect this change. The entire contents of the object 72 are copied to the latest version. The previous entry in the Title field 68, "distributed systems," is then moved to a Title field 82 of a prior version of the object 72, which is designated by reference numeral 80 (and by delta time 11). The new entry is placed into the Title field 68.

Referring now to index entries 74 and 84 in FIG. 5, the rightmost entries in brackets are representative of the delta change records which can be applied to the latest version to obtain a view of the index entry at an historical time. Each delta change record indicates, respectively, the operation to the index entry, i.e., add (+) or remove (−), the time the operation occurred, and the object ID of the object that is being added or removed. For the index entry 74, the delta change record indicates that at delta time 12, the word "distributed" was removed from the Title field of the object having an object ID of 11 which identifies the object 72.

The sets of object ID's in the index entries 74 and 84 are updated respectively. The set for the index entry 74 is empty, indicating that at the current time (for FIG. 5, this is 12), no objects contain the field/value pair, Title "distributed." Correspondingly, the index entry 84 contains a value of 11 for the object ID in its set.

Figure 6:
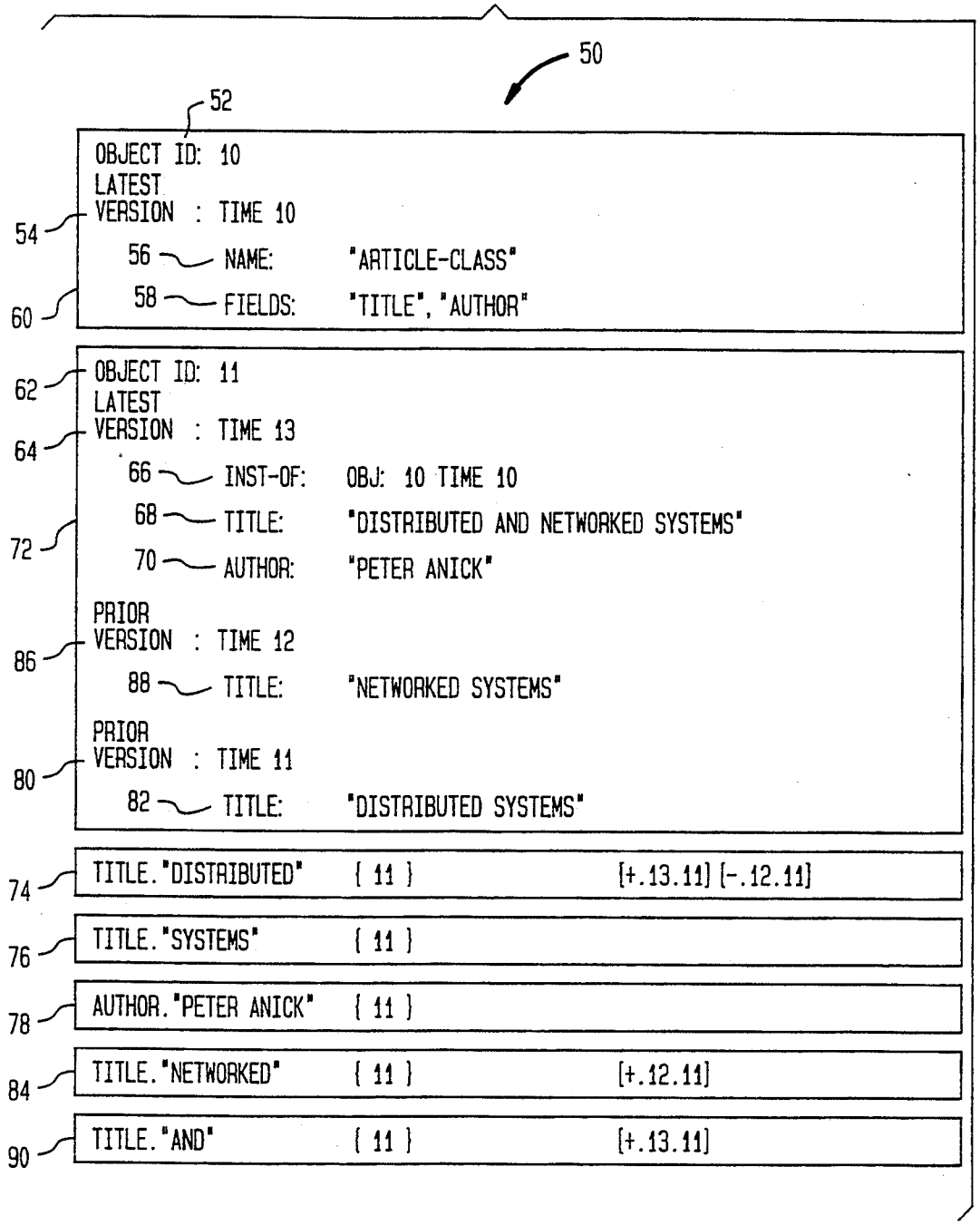
FIG. 6 is an illustration of a modified version of the exemplary database constructed according to the present invention illustrated in FIG. 5.

Although the index entries 76 and 84 both have a set containing a value of 11 for an object ID, examination of their delta change records shows the difference between the two. The delta change for the index entry 84 shows that the value 11 for an object ID was added to the set at time 12, and therefore, was not part of the set before that time. In particular, it was not part of the set at time 11, when the object was created. The lack of delta changes for the index entry 76 indicates that the value 11 of the object ID must have been added to the set when the object was created (i.e., at time 11). Furthermore, since the field/value pair, Title "systems" was part of both versions of the object 72, the index entry 76 did not need to be updated for the new version of the object. Referring now to FIG. 6, there is illustrated the exemplary database 50 of FIG. 5 after the second object 72 has again been modified. At time 13 indicated the value stored in the latest version field 64, the value in the Title field 68 of the object 72 has been modified from "networked systems" to "distributed and networked systems." A new version of the object 72 referred to as the "latest version" is created to reflect this change. The entire contents of the object 72 is copied to the latest version. The previous entry in the Title field 68, "networked systems" is then moved to a Title field 88 of a prior version of the object 72 (designated by reference numeral 86), and the new entry in the Title field 68 is placed into the latest version of the object 72 (designated by reference numeral 64).

The index entry 74 is modified to indicate the foregoing change. Specifically, a new delta record is added to the index entry 74 to indicate that the word "distributed" was added to the Title field 68 of the object with a value of 11 for an object ID at time 13. Similarly, a new index entry 90 is created and a new delta record is added to the index entry 90 to indicate that the word "and" was added to the Title field 68 with a value of 11 for an object ID at time 13.

Figure 7:
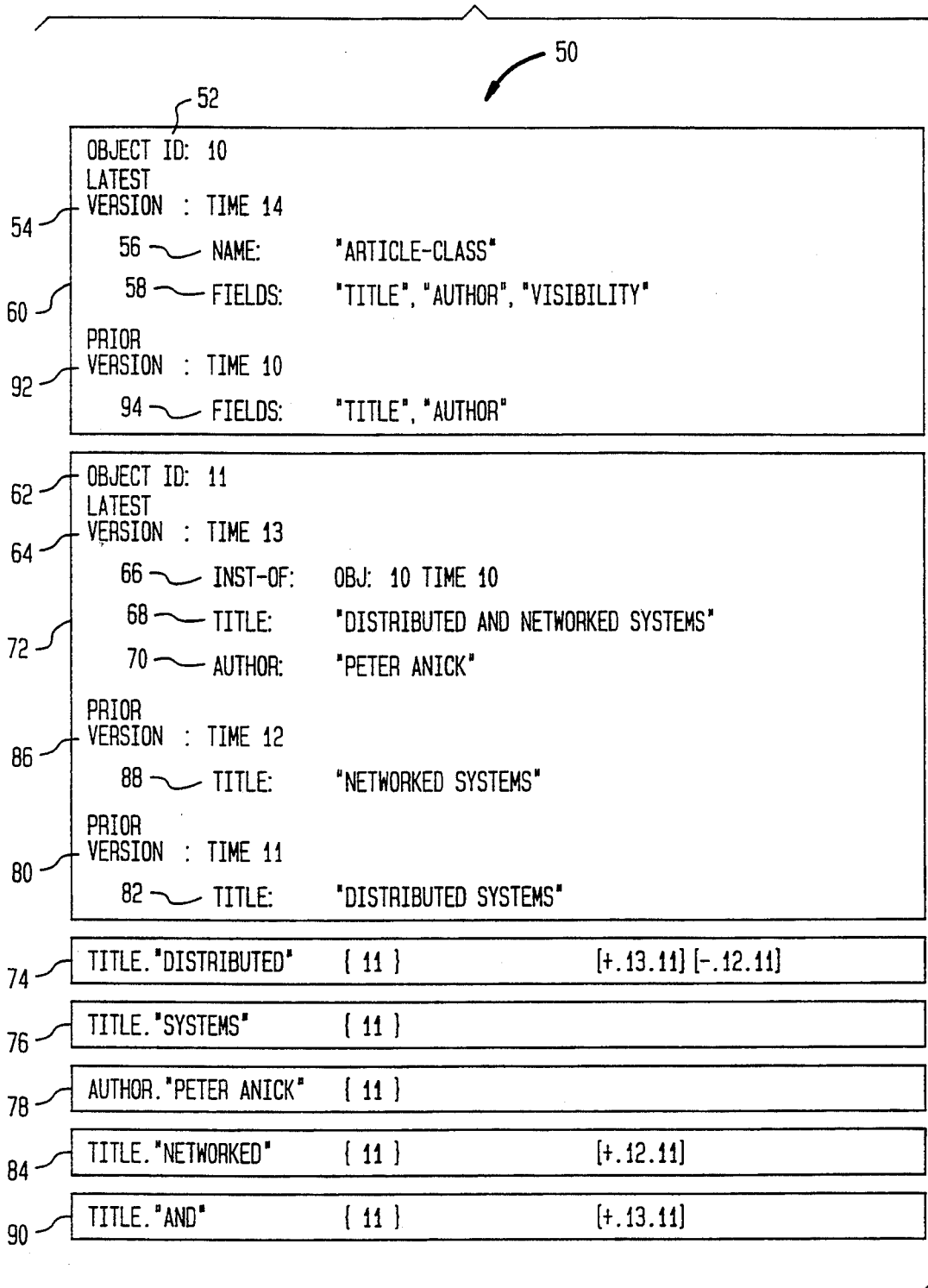
FIG. 7 is an illustration of a modified version of the exemplary database constructed according to the present invention illustrated in FIG. 6.

Referring now to FIG. 7, there is illustrated the exemplary database 50 of FIG. 6 after the object 60 is modified. At time 14, another field referred to as "Visibility" is added to the Article-Class. A new version of the object 60 referred to as the "latest version" is created to reflect this change. The entire contents of the object 60 are copied to the latest version. The previous entries in the Fields field 58 are then moved to a Field field 94 of a prior version of the object 60 (designated by reference numeral 92), and the new entry in the Field field 58 is placed into the latest version of the object 60. Note that there is no change made to the associated index entries because these refer to events which occurred before modifying the class object 60.

Referring now to FIGS. 8A–8B, there is illustrated the exemplary database 50 of FIG. 7 after another instance of the object 60 is added. As illustrated, at time 15, another instance of Article-Class is added as object 110. The object 110 has field/value pairs for Inst-Of field 100, Title field 102, Author field 104 and a Visibility field 106. Values are stored in each one of the foregoing fields. Note that the object 110 has one more field/value than the object 72. This is because each points to a different version of the "Article Class" object 60.

Entries are added to existing index entries 76 and 78 to indicate that the index entry for the Title field has been modified to indicate that "systems" was added at time 15 and the Author field has been modified to indicate that "Peter Anick" was added at time 15. New index entries 112 and 114 are added to reflect the addition of the values "database" to the Title field and "Customer" to the Visibility field.

Figure 9A:
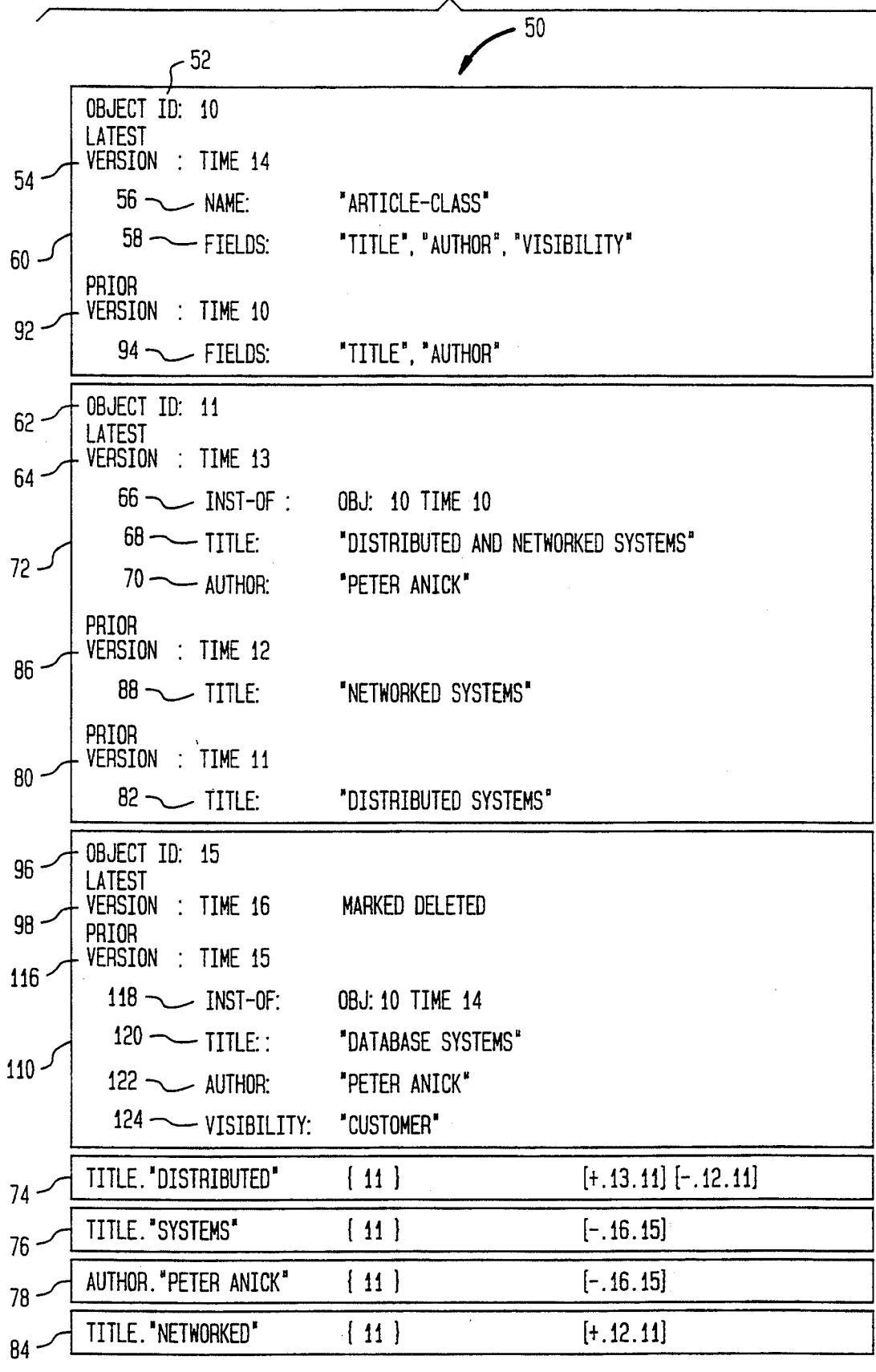

Referring now to FIGS. 9A–9B, there is illustrated the exemplary database 50 of FIGS. 8A–8B after the object 110 has been deleted. As indicated, at time 16 the object 110 is deleted. This deletion is reflected in the database 50 by clearing the latest version of the object 110 (designated by reference numeral 98) and copying the latest version of 110 of FIG. 8A to a prior version (designated by reference numeral 116) with all of the fields being copied into this prior version.

To complete the deletion operation, all entries in the index are removed for all of those added at time 15. Thus, delta change records are added to index entries 76, 78, 112 and 114 to indicate that the values have been deleted from the object 110 at time 16.

Reference is now to made to FIGS. 10A–10E, to illustrate the processing flow according to the present invention for adding or modifying objects stored in the database. FIGS. 10A–10E represent the software module that is invoked by the computer 12 (FIG. 1) when a user such as a database administrator updates the database.

Figure 10A:
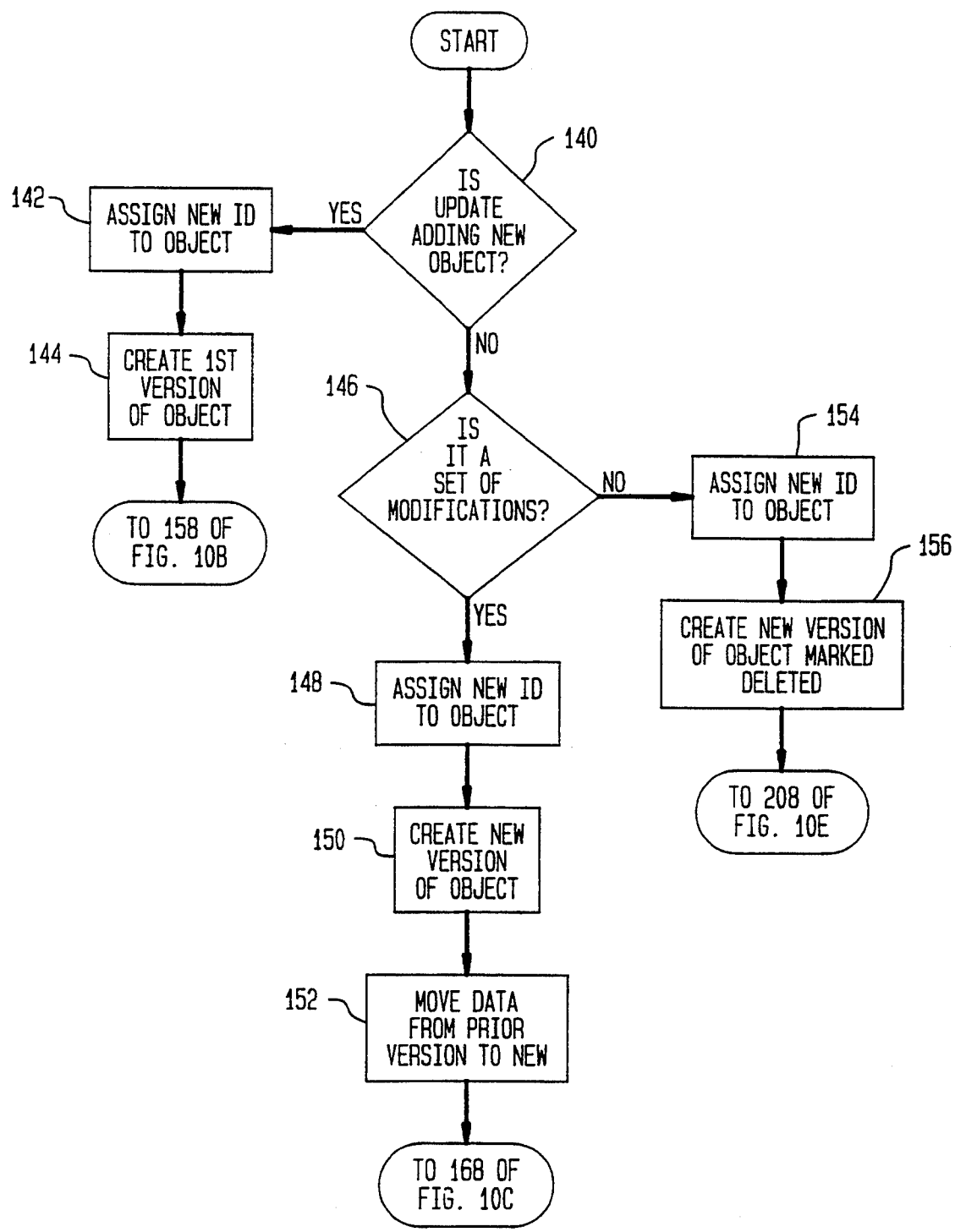
FIGS. 10A, 10B, 10C, 10D, and 10E illustrate the processing flow for updating a database according to the present invention.

Upon entering the processing flow illustrated in FIG. 10A, the database event being processed is tested to determine if it is adding an object to the database in step 140. If it is, control passes to step 142 where a new ID generated by the identification generator function of the computer 12 (FIG. 1) is assigned to the object. Next, a first version of the added object is created in the database in step 144.

Figure 10B:
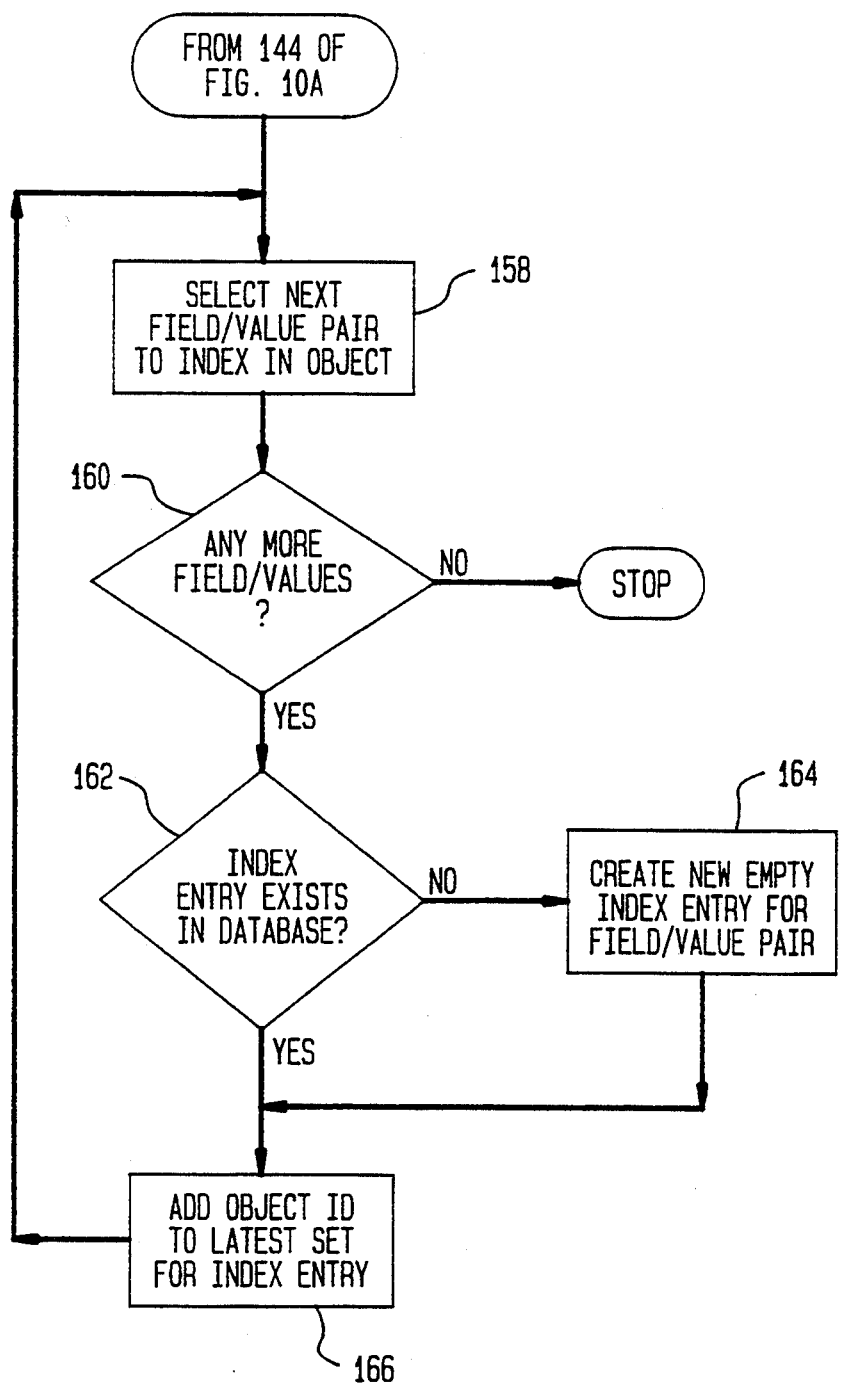

Control is then passed to a program loop in FIG. 10B which processes the new object and generates the appropriate index entries for the object. Upon entering the processing flow in FIG. 10B, the next, or if this is the first pass through this program loop, the first field/value pair to index in the object is selected in step 158. A test is then performed in step 160 to determine if there are any more field/value pairs to index in the new object. If there are none, the new object has been fully indexed, and, therefore, processing stops.

If it is determined in step 160 that there are more field/value pairs to index in the new object, control passes to step 162 where another test is performed to determine if any index entries exist in the database for the new object. If there are none, control passes to step 164 where a new empty index entry for current field/value pair being processed is created. Control then passes to step 166.

If it was determined in step 162 that index entries do exist in the database for the current field/value pair, control is passed to step 166 to add the object ID to the latest set for the current field/value pair index entries. Control is then back to step 158 where the loop is repeated until all field/value pairs have been entered into the database as detected by step 160.

Referring again to FIG. 10A, if it is determined in step 140 that the update operation being processed is not adding an object to the database, control passes to step 146. In this step, another test is performed to determine if the update operation is a set of modifications. If it is, control passes to step 148 where a new ID generated by the identification generator function of the computer 12 is assigned to the object. Next, a new version of the object being modified is created in the database in step 150. The data stored in the prior version of the object is then copied to the new version of the object in step 152.

Figure 10C:
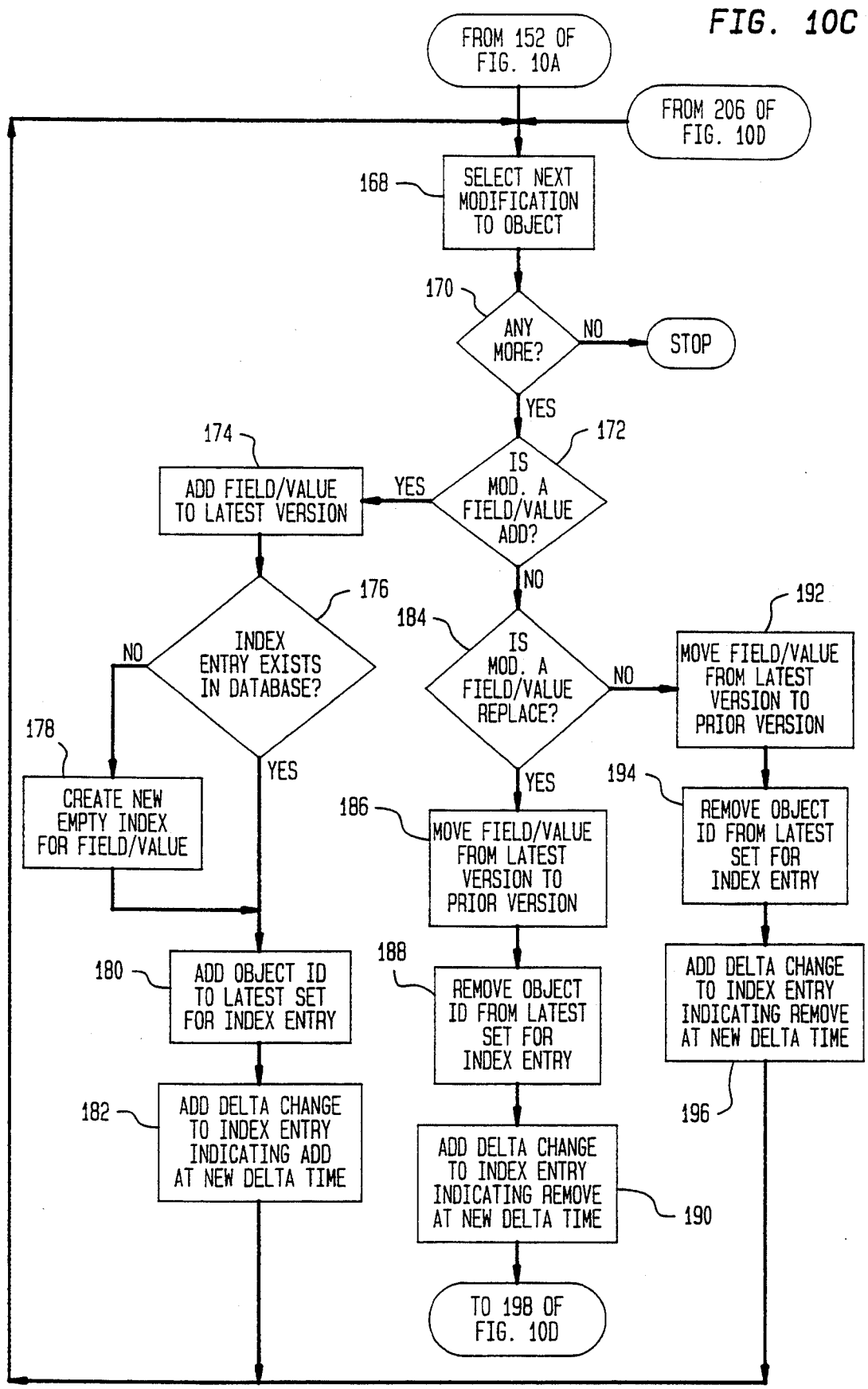

Control is then passed to a program loop in FIG. 10C which continues processing the modified version of the object. Upon entering the processing flow in FIG. 10C, the next, or if this is the first pass through this program loop, the first modification to the object is selected in step 168. A test is then performed in step 170 to determine if there are any more modifications to the object that have not been processed. If there are none, the object has been modified, processing is complete, and, therefore, processing stops.

If it is determined in step 170 that there are more modifications to be processed, control passes to step 172 where it is determined if the modification currently being processed is an add a field/value pair operation. If it is, control passes to step 174 where the field/value pair is added to the latest version of the object. Next, a test is performed in step 176 to determine if any index entry exists in the database for the current field/value pair. If there is none, control passes to step 178 where a new empty index entry for current field/value pair being processed is created. Control then passes to step 180.

If it was determined in step 176 that index entries do exist in the database for the new object, control is passed to step 180 to add the object ID to the latest set for index entries for the current field/value pair. The delta change is then added to the index entry to indicate that the field/value pair was added at the new delta time in step 182. This involves creating a prior version with an indication of an add operation, the delta time newly generated and the object ID. Control is then passed back to step 168 where the loop is repeated until all field/value pairs have been entered into the database as detected by step 170.

If it is determined in step 172 that the modification currently being processed is not an add field/value pair operation, control passes to step 184 where another test is performed to determine if the modification is a field/value pair replace operation. If it is, control passes to step 186 where the prior field/value pair is moved from the latest version of the object to the prior version. The object ID is then removed from the latest versions of the set of index entries for the modified field/value pair in step 188. The delta change is then added to the index entry to indicate that the field/value pair was removed at the new delta time in step 190. This involves creating a record indicating a removal operation at the new delta time for the object 11D.

Figure 10D:
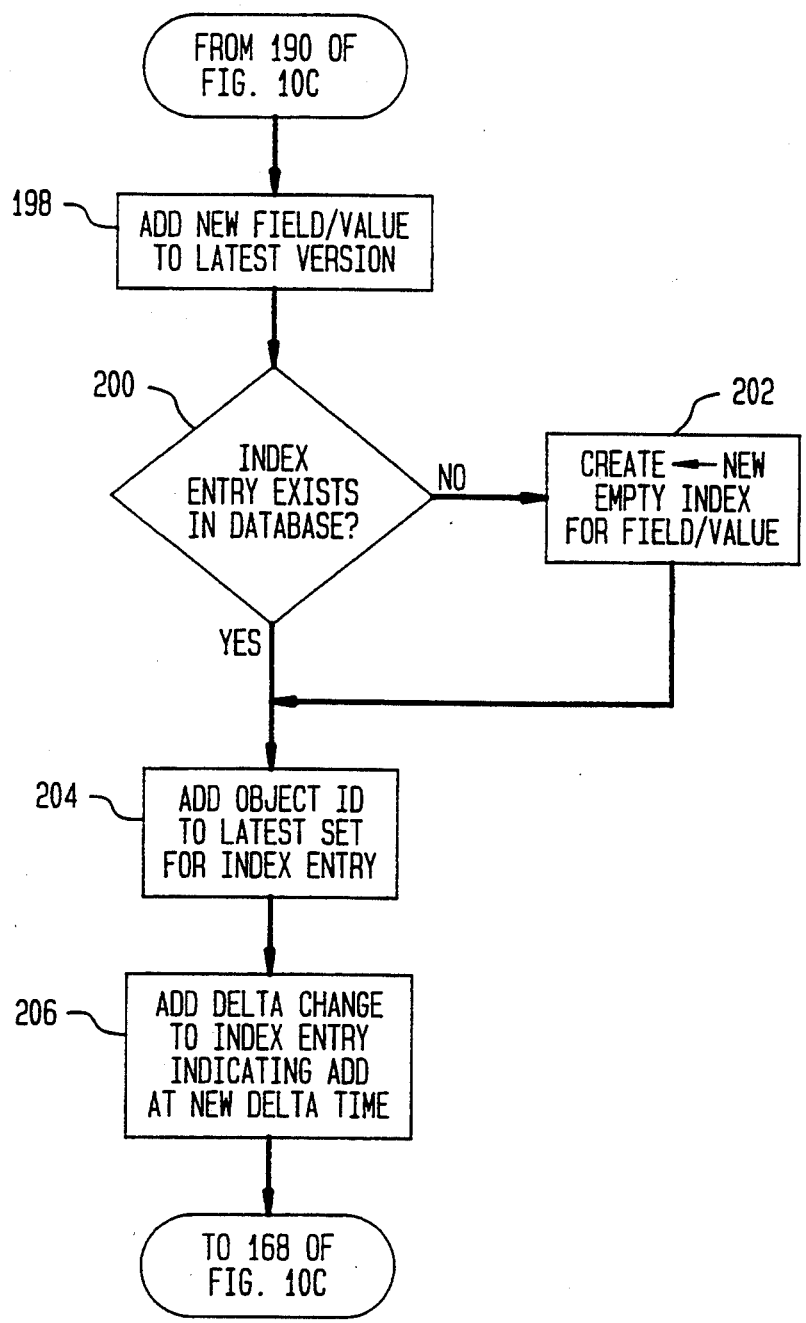

Control is then passed to step 198 of FIG. 10D where the new field/value pair is added to the latest version of the object. Next, a test is performed in step 200 to determine if any index entries exist in the database for the current field/value pair. If there are none, control passes to step 202 where a new empty index entry for the current field/value pair being processed is created. Control then passes to step 204.

If it was determined in step 200 that index entries do exist in the database for the new object, control is passed to step 204 to add the object ID to the latest set for index entries for the current field/value pair. The delta change is then added to the index entry to indicate that the field/value pair was added at the new delta time in step 206. This involves creating a prior version with an indication of an add operation, the delta time newly generated and the object ID. Control is then passed back to step 168 of FIG. 10C where the loop is repeated until all field/value pairs have been entered into the database as detected by step 170.

Referring again to FIG. 10C, if it is determined in step 184 that the modification currently being processed is not a field/value pair replace operation, a field/value pair removal operation is indicated. Control passes to step 192 where the removed field/value pair is moved from the latest version of the object to the prior version. The object ID is then removed from the latest versions of the set of index entries for the modified field/value pair in step 194. The delta change is then added to the index entry to indicate that the field/value pair was removed at the new delta time in step 196. This involves creating a record indicating a removal operation at the new delta time for the object ID. Control is then passed back to step 168 where the loop is repeated until all modifications have been entered into the database as detected by step 170.

Referring again to FIG. 10A, if it is determined in step 146 that the update operation being processed is not a set of modifications, then the operation is identified as a deletion. Control then passes to step 154 where a new ID generated by the identification generator function of the computer 12 is assigned to the object. Next, a new version of the object is created in the database and marked for deletion in step 156.

Figure 10E:
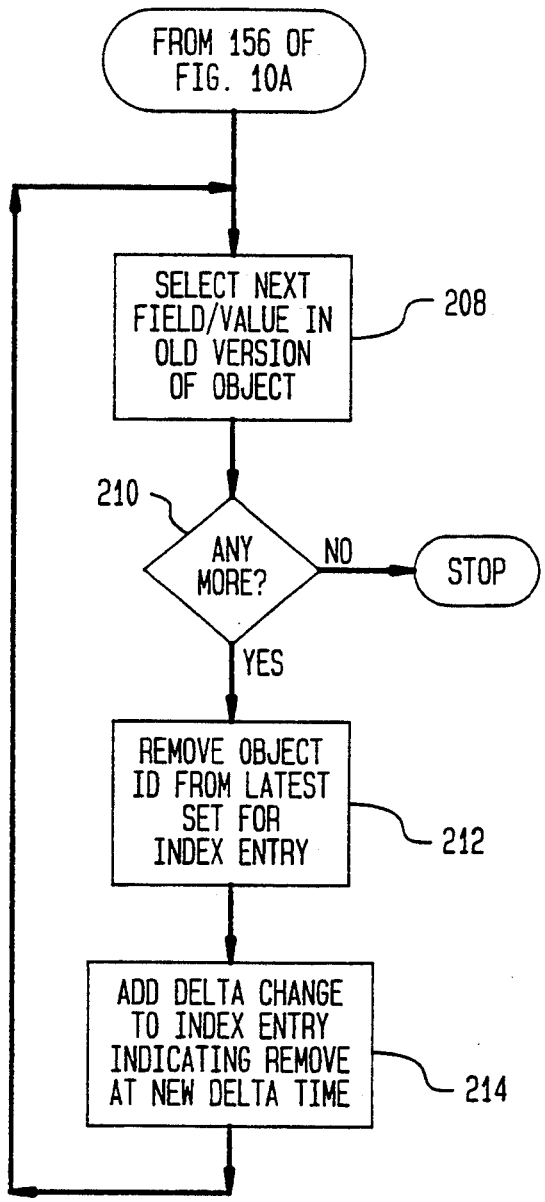

Control then passes to a program loop in FIG. 10E which processes the deletion of the object. Upon entering the processing flow in FIG. 10E, the next, or if this is the first pass through this program loop, the first field/value pair to be removed is selected from the old version of the object in step 208. A test is then performed in step 210 to determine if there are any more field/value pairs to be removed from the index. If there are none, the deleted object has been fully indexed, and, therefore, processing stops.

If it is determined in step 210 that there are more field/value pairs to be removed, control passes to step 212 where the object ID is removed from the latest set in the index entry for the current field/value pair. The delta change is then added to the index entry to indicate that the field/value pair was removed at the new delta time in step 214. This involves creating a record indicating a removal operation at the new delta time for the object ID. Control is then passed back to step 208 to continue processing until all field/value pairs for the object being removed have been removed as determined in step 210.

In addition to performing database updates, the exemplary system 10 also performs retrieval operations based upon a user query. There are two levels of retrieval which an information retrieval system incorporating a database constructed according to the present invention can perform. They are retrieval of an index entry and retrieval of an object. Both types of retrieval are performed at a specific time. Reconstruction of both the index or the objects can be done for any historical, i.e., delta point in time.

Typically, the retrieval of the index is an operation performed by an information retrieval system in response to a user query to retrieve objects satisfying the query. The use of the index enhances retrieval speed.

Figure 11:
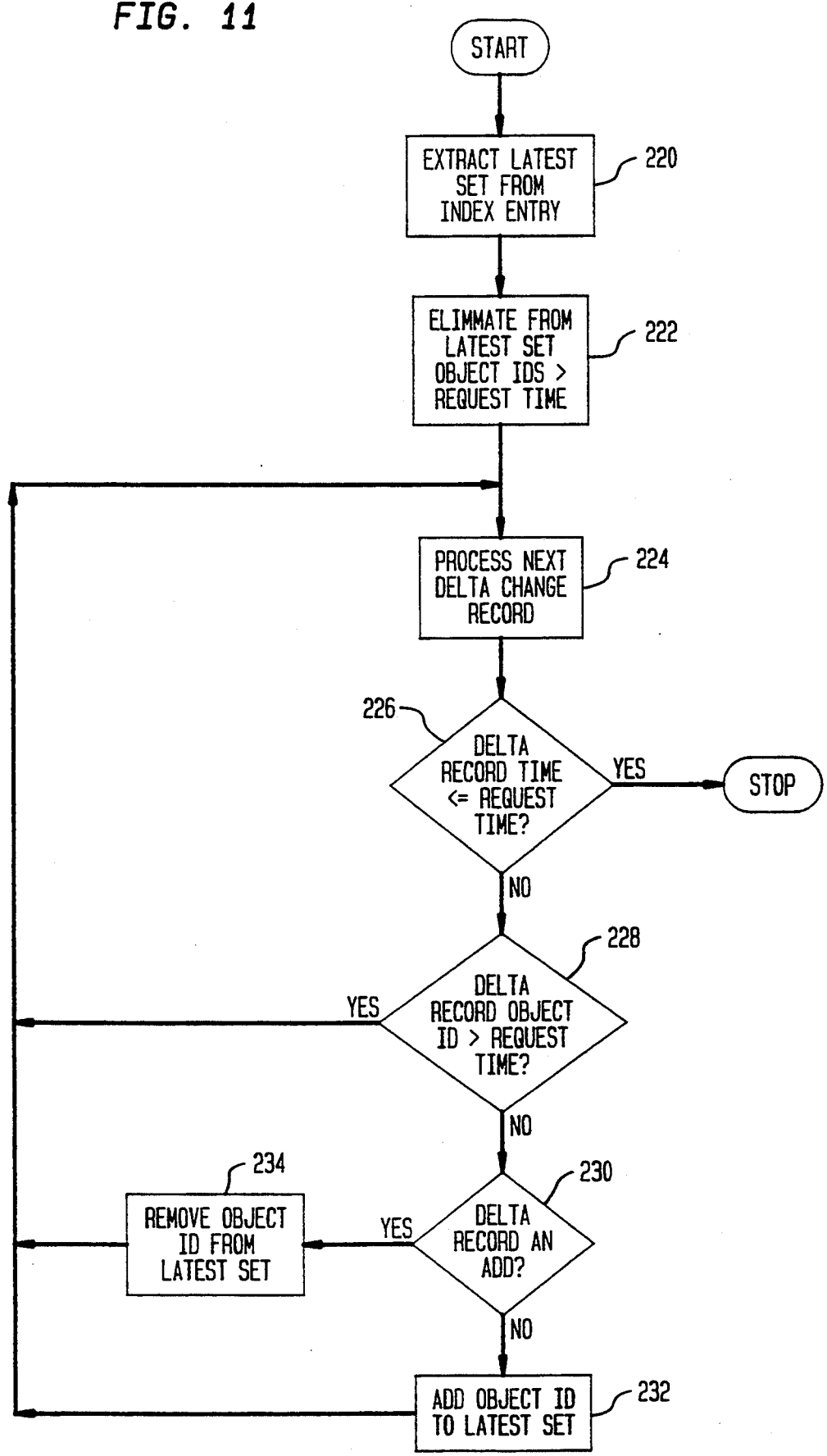
FIG. 11 illustrates the processing flow for performing an index retrieval operation on a database constructed according to the present invention.

Reference is now to made to FIG. 11 to illustrate the processing flow according to the present invention for processing a query issued by a user to retrieve desired objects from the database. FIG. 11 represents the software module that is invoked by the computer 12 (FIG. 1) when a user issues a query which requests that certain objects be retrieved from the database.

The computer 12 (FIG. 1) invokes the software module illustrated in FIG. 11 when it receives a query from a user. User queries may take many different forms. An example of a user query is "Find all objects which contain 'Peter Anick' in the Author field at time 14." Thus, the computer 12 will invoke the software module of FIG. 11 to retrieve all objects with "Peter Anick" in the Author field. However, the user has specified a time, thus, the retrieval request is for the view of objects containing "Peter Anick" in the Author field at a particular point in time.

Upon entering the processing flow of FIG. 11, the latest set of object ID's is extracted from the index entry (e.g., for Author. Peter Anick) stored in the database in step 220. All ID's in the set retrieved in step 220 are then processed in step 222 to eliminate object ID's which indicate the changes are later in time than the request time specified in the query.

Control is then passed to step 224 which is the first step in a loop which reconstructs the view of the database for the user at the time specified, if any, in the query. Step 224 processes the next, or if this is the first time through this loop, the first delta change record.

The delta record time is then compared with the request time to determine if it is less than or equal to the request time in step 226. If it is, processing stops since subsequent change records are for earlier versions of the set of object ID's.

If the delta record time is not less than or equal to the request time, control passes to step 228 where the delta record object ID is compared to the request time to determine if it is greater than the request time. If it is, control passes back to step 224 to process the next delta change record.

If the delta record object ID is not greater than the request time, control passes to step 230 where it is determined if the current delta record indicates that it is an add change to the object. If it is, control passes to step 234 where the object ID in the current delta record is added to the latest set and then control passes back to step 224 to process the next delta change record.

If it is determined in step 230 that the current delta record is not an add change to the object, control passes to step 232 where the object ID in the current delta record is removed from the latest set. Control is then passed back to step 224 to process the next delta change record.

Set forth below are examples of queries a user can issue to the system 10 (FIG. 1) and the resulting index lookups that are performed. These examples demonstrate historical querying as well as current time querying. Reference is made to FIGS. 3–9B to illustrate the retrieval process.

In a first example, a user inputs a query "Find all objects which contain the entry 'Peter Anick' in the Author field at the current time" through the video display terminal 18 (FIG. 1). The latest time at which an event occurred in the database 50 is 16 as indicated in FIG. 9A in identifier 98. Thus, this lookup operation is equivalent to retrieving from the index entry for Author field "Peter Anick." Following the steps set forth in FIG. 11 which illustrate the processing flow for retrieval, the latest set which matches the query is retrieved from index entry 78 (FIGS. 4–7, 8A and 9A), which is {11}. Since the current time is 16, no objects need to be eliminated from the set. There are no delta change records at times later than 16, so the set returned is {11}.

In a second example, the query from a user is "Find all objects which contain the index entry "Peter Anick" in the Author field at time 15." Again, following the steps set forth in FIG. 11 which illustrate the processing flow for retrieval, the latest set which matches the query is retrieved from index entry 78 (FIGS. 4–7, 8A and 9A), which is {11}. No objects need to be eliminated from the set because all of the object ID's of the set are less than the time specified in the query.

One delta change record needs to be processed since the index entry 78 in FIG. 9A indicates that a change to an object containing "Peter Anick" in the Author field has occurred at time 16, because its delta time is later than the access time. The change indicates it is a removal so the object is added to the set, yielding the set {11, 15}. Thus, the set returned is {11, 15}.

In a third example, the query from a user is "Find all objects which contain the index entry "Peter Anick" in the Author field at time 14. Again, following the steps set forth in FIG. 11 which illustrate the processing flow for retrieval, the latest set which matches the query is retrieved from index entry 78 (FIGS. 4–6, 8A and 9A), which is {11}. No objects need to be eliminated from the set because all of the object ID's of the set are less than the time specified in the query.

One delta change record needs to be processed since the index entry 78 in FIG. 9A indicates that a change to an object containing "Peter Anick" in the Author field has occurred at time 16, because its delta time is later than the access time. However, since the object ID in the index entry is 15 which is higher than the request time 14, it is ignored. The set returned is {11}.

In a fourth example, the query from a user is "Find all objects which contain the index entry "distributed" in the Title field at time 11. Again, following the steps set forth in FIG. 11 which illustrate the processing flow for retrieval, the latest set which matches the query is retrieved from index entry 74 (FIGS. 4–6, 8A and 9A), which is {11}. No objects need to be eliminated from the set because all of the object ID's of the set are less than the time specified in the query.

Two delta change record needs to be processed since the index entry 74 in FIG. 9A indicates that two changes to two separate objects containing "distributed" in the Title field have occurred at times 13 and 12. The changes are processed to remove the object identifies by the object ID 11 from the set, leaving a null set. Then, the next change is processed to add the object identifies by the object ID 11 to the set processed, leaving {11}. Thus, the set returned is {11}.

As with index retrieval, the purpose of the retrieval process to retrieve objects is for the view of the object at a particular point in time. Set forth below is an example to illustrate the retrieval of an object. Reference is made to FIGS. 3–9B to illustrate the retrieval process.

In this example, a user issues a query that requests the retrieval of the object 80 at time 11. The latest version of the object 80 is retrieved. The prior version of the object 80 has a delta time of 12 which is greater than or equal to 11, so the corresponding delta changes are applied. Thus, "networked systems" is substituted for "distributed and networked systems" in the title. The next prior version of the object 80 has a delta time of 11 which is equal to 11, therefore, it is applied to substitute "distributed systems" for "networked systems" in the title. Thus, the correct version of the object 80 can then be returned to the user.

It should be understood that the foregoing description of the present invention is meant to be illustrative only. Thus, although only a few examples of the present invention have been described in detail, it is clear that the features of the present invention may be adapted to many different situations without departing from the spirit of the invention.

What is claimed is:

1. A computer implemented method for versioning a database which is stored in a memory, the database including a plurality of information objects and an index representative of the plurality of information objects, the index includes a plurality of index entries, each index entry identifying at least one of the plurality of information objects, the method comprising the steps of:
   (a) maintaining a latest version of each one of the plurality of information objects in the database;
   (b) maintaining a latest version of each one of the plurality of index entries in the database;
   (c) maintaining in the database a prior version of each one of the plurality of information objects than has been changed, each prior version of each one of the plurality of information objects that has been changed being a representation of a portion of the prior version that represents a difference between the one of the plurality of information objects in a prior state and a later version of the one of the plurality of information objects;
   (d) maintaining in the database a set of change records in each one of the plurality of index entries, each change record in the set of change records corresponding to a change that, has been made to one of the plurality of information objects, each change record in the set of change records comprising an indicator identifying a type of change made, a first identification tag identifying one of the plurality of information objects affected by the change and a second identification tag representative of a time that the change occurred; and
   (e) processing the set of change records to create a version of the index at a pre-selected time.

2. The method according to claim 1 wherein the step of maintaining a prior version of each one of the plurality of information objects that has been changed comprises the step of maintaining an indication for each one of the plurality of information objects to represent the prior state of the one of the plurality of information objects, the indication comprising the second identification tag representative of the time that the change occurred and at least one field including information representative of the prior state of the one of the plurality of information objects prior to the change that occurred.

3. The method according to claim 1 wherein the step of maintaining a latest version of each one of the plurality of index entries further comprises the step of storing, for each one of the plurality of index entries, a set of the first identification tags in each one of the plurality of index entries, each set of the first identification nags identifying the information objects associated with an index entry.

4. The method according to claim 3 wherein the step of maintaining a latest version of each one of the plurality of information objects further comprises the step of storing, for each one of the plurality of information objects, the second identification tag representative of a time that the latest version was stored in the database.

5. The method according to claim 4 wherein the first and second identification tags are generated by a single identification tag generation subroutine.

6. A computer implemented method for recreating a prior version of an information object and an index entry in a versioned database which is stored in a memory, the database including a plurality of information objects and an index representative of the plurality of information objects, the index includes a plurality of index entries, the method comprising the steps of:
   (a) maintaining latest versions of each one of the plurality of information objects and each one of the plurality index entries in the database;
   (b) maintaining in the database portions of each one of the plurality of information objects that were updated, said portions being a representation of prior versions of each one of the plurality of information objects;
   (c) maintaining a set of change records in each one of the plurality of index entries, each change record in the set of change records corresponding to a change that has been made to one of the plurality of information objects, each change record in the set of change records comprising an indicator identifying a type of change made and a first identification tag identifying one of the plurality of information objects affected by the change; and (d) generating a prior version of each one of the plurality of index entries utilizing the latest versions of each one of the plurality of index entries and the set of change records.

7. The method of claim 6 further comprising the step of generating a prior version of each one of the plurality of information objects utilizing the latest versions of each one of the plurality of information objects and the portions of each one of the respective plurality of information objects that were updated.

8. A computer implemented method for recreating a prior version of an index entry in a versioned database which is stored in a memory, the prior version corresponding to a state of the index entry at a preselected earlier time, the database including a plurality of information objects and an index representative of the plurality of information objects, the index includes a plurality of index entries, each index entry identifying at least one of the plurality of information objects, the method comprising the steps of:

(a) assigning a first identification tag to one of the plurality of information objects when one of the plurality of information objects is created, the identification tag being utilized to identify the one of the plurality of information objects;

(b) assigning a second identification tag to a modification of the one of the plurality of information objects;

(c) storing the first and second identification tags with the one of the plurality of information objects;

(d) storing a latest version of an index entry as a set of first and second identification tags, wherein each one of the first identification tags in the set corresponds to an information object associated with the index entry at a most recent time in the database; and (e) storing change information with the index entry for use in reconstructing the prior version of the index entry at the preselected earlier time;

(f) retrieving the latest version of the index entry; and (g) processing the change information for each index entry having a second identification tag corresponding to a time later than or equal to the preselected earlier time to apply said change information against the latest version of the index entry retrieved in step (f) until the index entry is restored to its state at the preselected earlier time.

9. A computer implemented method for versioning a database which is stored in a memory, the database includes a plurality information objects and an index representative of the plurality of information objects, the method comprising the steps of:

(a) maintaining latest versions of each one of the plurality of information objects and the index in the database, the index including entries that identify one or more of the plurality of information objects;

(b) generating a first identification tag representative of the time that a latest version of one of the plurality of information objects is added to the database;

(c) storing the first identification tag with the latest version of the one of the plurality of information objects;

(d) maintaining portions of the one of the plurality of information objects and the index related to the one of the plurality of information objects that were updated in the database as encoded representations of the updates as prior versions of the one of the plurality of information objects and the index related to the one of the plurality of information objects;

(e) generating a plurality of second identification tags representative of the prior versions of the one of the plurality of information objects;

(f) storing the second identification tags with the respective prior versions of the one of the plurality of information objects;

(g) storing the second identification tags respective prior versions of the index; and (h) processing the stored first identification tags and stored second identification tags to create a version of the database.

10. An information retrieval system comprising:

a memory system;

a database stored in the memory system, the database comprising a plurality of information objects and an index representative of the plurality of information objects, the index comprises a plurality of index entries, the database includes:

latest versions of each one of the plurality of information objects and each one of the plurality of index entries in the database, a prior version of an information object, the prior version of an information object stored in the memory system and including an encoded representation of a change made to the information object, and a prior version of an index entry, the prior version of an index entry stored in the memory system and including a set of change records, each change record in the set of change records corresponding to a change that has been made to one of the plurality of information objects, each change record in the set of change records comprising an indicator identifying a type of change made, a first identification tag identifying the one of the plurality of information objects affected by the change, and a second identification tag identifying a time the change made to the one of the plurality of information objects occurred; and processing means for processing the set of change records to create a version of the index at a preselected time.

11. An information retrieval system comprising:

a memory system;

a database stored in the memory system, the database comprising a plurality of information objects and an index representative of the plurality of information objects; and a computer coupled to the memory system, the computer includes:

means for assigning a first identification tag to an information object, the first identification tag identifying a plurality of versions of the information object, means for assigning a second identification tag to a modification of the information object, means for storing the first and second identification tags with a version of the information object associated with the modification, means for storing a latest version of an index entry as a set of first and second identification tags, wherein each one of the first identification tags in the set corresponds to an information object associated with the index entry at a most recent time in the database, means for storing change information with the index entry for use in reconstructing a prior version of the set of first and second identification tags, the prior version corresponding to a state of the database at a preselected earlier time; and means for processing said change information to reconstruct a prior version of the set of first and second identification tags.

12. A computer implemented method for indexing a database stored in a memory, the database including one or more versions of a plurality of information objects and an index for accessing the plurality of information objects, the index comprising a plurality of index entries, the method comprising the steps of:

(a) storing a latest version of each one of the plurality of index entries identifying a set of information objects belonging to the index entry at a most recent time;

(b) storing change information with each one of the plurality of index entries for recreating a plurality of prior versions of the index entry, each of the plurality of prior versions of the index entry corresponding to the set of information objects belonging to the index entry at a prior time, the change information comprising:

a first identification tag to identify an information object affected by a change to the set of information objects belonging to the index entry, a second identification tag representing the time that the change occurred, and an indicator to identify a type of change made; and processing the change information to create a version of the index at a preselected time.

13. A computer implemented method for versioning a database which is stored in a memory, the database including an objects database, the objects database including a plurality of information objects, and an index database, the index database including a plurality of index entries, each index entry identifying at least one of the plurality of information objects, the method comprising the steps of:

(a) maintaining a latest version of each one of the plurality of information objects in the objects database;

(b) maintaining a latest version of each one of the plurality of index entries in the index database;

(c) maintaining in the objects database a prior version of each one of the plurality of information objects that has been changed, each prior version of each one of the plurality of information objects that has been changed being a representation of the one of the plurality of information objects in a prior state;

(d) maintaining in the index database a set of change records in each one of the plurality of index entries, each change record in the set of change records corresponding to a change that has been made to one of the plurality of information objects, each change record in the set of change records comprising an indicator identifying a type of change made, a first identification tag identifying the one of the plurality of information objects affected by the change and a second identification tag representative of a time that the change occurred; and (e) processing the set of change records in the index database to create a version of the index database at a preselected time.

* * * * *